Figure 1:
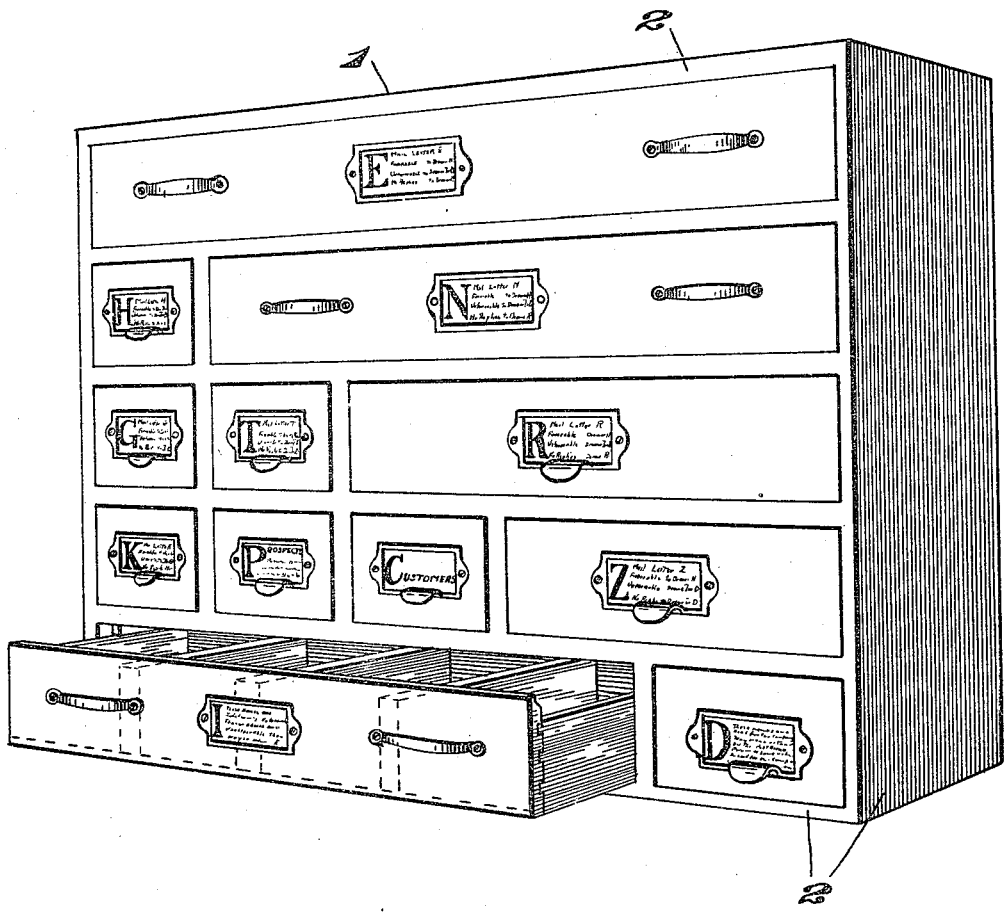

J. C. DANDO.
FILING CABINET.
APPLICATION FILED JULY 11, 1912.

1,231,134.

Patented June 26, 1917.
2 SHEETS—SHEET 1.

WITNESSES:

INVENTOR:
Joseph Clifford Dando,
BY
Russell M. Everett,
ATTORNEY.

MAIL LETTER E
Favorable · · · to Drawer H
Unfavorable to Drawer I or D
No Replies · · · to Drawer N

MAIL LETTER K
Favorable   to Drawer P or C
Unfavorable to Drawer I or D
No Replies · · to Drawer T

MAIL LETTER H
Favorable   to Drawer P or C
Unfavorable to Drawer I or D
No Replies · · · to Drawer G

PROSPECTS
Personal dictation or attention until conclusion C, I or D is reached.

MAIL LETTER N
Favorable · · · to Drawer H
Unfavorable to Drawer I or D
No Replies · · · to Drawer R

CUSTOMERS

MAIL LETTER G
Favorable   to Drawer P or C
Unfavorable to Drawer I or D
No Replies · · to Drawer K

MAIL LETTER Z
Favorable · · · to Drawer H
Unfavorable to Drawer I or D
No Replies  to Drawer I or D

MAIL LETTER T
Favorable   to Drawer P or C
Unfavorable to Drawer I or D
No Replies   to Drawer I or D These names are Indefinitely Unfavorable. If new names are unobtainable, they may be returned to Drawer E.

MAIL LETTER R
Favorable · · · to Drawer H
Unfavorable to Drawer I or D
No Replies · · · to Drawer Z These names are DEAD for this Campaign. They were returned by Post Office, are Deceased, Out of Business or have replied Definitely Unfavorable. No good for this Campaign, except for checking.

Fig. 2.

UNITED STATES PATENT OFFICE.

JOSEPH CLIFFORD DANDO, OF PHILADELPHIA, PENNSYLVANIA, ASSIGNOR TO THE DANDO PRINTING AND PUBLISHING COMPANY, A CORPORATION OF PENNSYLVANIA.

FILING-CABINET.

1,231,134.   Specification of Letters Patent.   Patented June 26, 1917.

Application filed July 11, 1912.   Serial No. 708,783.

*To all whom it may concern:*

Be it known that I, JOSEPH CLIFFORD DANDO, a citizen of the United States, residing at Philadelphia, in the county of Philadelphia and State of Pennsylvania, have invented certain Improvements in Filing-Cabinets, of which the following is a specification.

This invention relates to a cabinet particularly designed for use in connection with sales campaigns conducted by mail, through letters, booklets, circulars, etc., and the objects of the invention are to enable the names of a list to whom such matter is being sent to be properly classified, so as to prevent sending the wrong letter or other communication to any of the names, or sending it at the wrong time, or making similar mistakes; to enable the classification to be made automatically and progressively, so that at any time any name in the list can be readily located, and the exact status of the campaign with respect to that name accurately and fully ascertained; to separate the names of customers and those who show interest from those who show no interest whatever or reply unfavorably, and thus enable the list after it has been subjected to one sales campaign to be re-worked or again carried through another sales campaign; to enable practically all of the work of classification and correspondence to be done by a stenographer or clerk, without waste of time or confusion, and thus reduce the expense and difficulty of conducting the campaign; to thus facilitate sales directly by mail and render the results thereof more favorable, and to obtain other advantages and results as may be brought out in the following description.

Referring to the accompanying drawings, in which like numerals of reference indicate the same parts throughout the several figures, Figure 1 is a perspective view of the front of the cabinet with one of the drawers partly pulled out, and Fig. 2 shows in detail and collectively the designations for the various drawers of the cabinet, an understanding of which is necessary in explaining the operation and use of the cabinet.

In said drawings, 1 indicates a cabinet of any suitable size and form, made of any usual material and finished in any common and well-known manner, said cabinet comprising a body portion 2 in which is slidably arranged a series of drawers, the arrangement and relation of which in the cabinet constitutes my invention, as hereinafter more fully set forth. I have shown these drawers adapted to receive cards, not shown, such as are commonly used for card indexing purposes, but it will be understood that the said drawers might be adapted to contain files, or other appropriate representations of the names of a list.

At the top of the cabinet is a large drawer E, which is adapted to receive all the cards of the list to whom a certain or first letter or other piece of advertising has been sent. Beneath said large drawer E, and next adjacent to it, is a large drawer N, and a small drawer H, arranged in the same horizontal plane, and beneath said drawers, preferably at the bottom of the cabinet, as shown, is another large drawer I and small drawer D, the last-mentioned small drawer D being at the opposite end of the cabinet from the small drawer H, in horizontal line with the large drawer I. Beneath the said large drawer N and small drawer H, in horizontal alinement with each other, there is a large drawer R, and two small drawers T and G, the said large drawer R being beneath the large drawer N with the small drawer G beneath the small drawer H, and the small drawer T between the other two in that row. In the next row of drawers, which is the row next to the bottom drawers I and D, there is one large drawer Z and three small drawers K, P and C, respectively, the large drawer Z being beneath the large drawers above, with the C drawer arranged next to it and then the P and K drawers in turn. I prefer the arrangement of drawers with respect to each other and the cabinet which I have illustrated in the specific embodiment of the invention shown in the drawings, and the reasons for this will become apparent from an explanation of the use of the cabinet which I will next give.

As indicated, all the cards of the list to which a letter or other piece of advertising has been sent are first in the drawer E, preferably arranged alphabetically or otherwise so that any one can be readily found, and they remain there each until an answer has been received or until the time arrives to send a second letter. Considering first the cards containing the names of those from whom answers have been received, it will be understood that such answers are readily classified as either favorable or unfavorable. The cards of those from whom favorable answers have been received are put in the small drawer H next below the large drawer E as before described, and the cards of those from whom unfavorable answers have been received are put in the bottom drawers I or D of the cabinet. These last-mentioned cards are classified to the extent of putting in the small drawer D the cards of those who are of no use whatever for purposes of the sales campaign, such as because of death, removal, wrong address and so forth, and putting in the large drawer I the cards of those people who are not now interested, but will or may be later.

Disposition being thus made of the cards of all those in the first drawer E which answer or reply to the first letter or other piece of advertising, the cards of those who do not answer at all are at the end of a certain time transferred to the next lower large drawer N and a second letter sent them. Second letters are also sent to those who reply favorably, as shown by the cards in the small drawer H, but no further letters are sent to those whose cards are in the bottom drawers I and D. It will be understood therefore that at this stage all of the cards of those to whom second letters have been sent are in drawers H and N.

Orders are expected as the natural replies to the second letter sent those whose cards are in the H drawer; and, if received, those cards are immediately transferred to drawer C, which is for the cards of those who have become customers. Some of those whose cards are in the drawer H and receive the second letter, will answer seeking special information and their cards are transferred to drawer P and the special letter sent. The cards in drawer H of those who answer unfavorably to the second letter will be shifted to drawers I or D and classified therein as above described, while the cards of those who do not reply at all to letter H are put in drawer G and a third letter sent to the persons whom they represent.

The cards in drawer G are distributed the same as has just been described in connection with drawer H, so far as orders, inquiries and unfavorable replies are concerned, being shifted accordingly to drawers C, P, I or D, and the cards in drawer G of those who do not reply at all to the third letter are put in drawer K and a fourth letter sent to the persons whom they represent.

The cards in drawer K are distributed the same as has just been described in connection with drawers H and G, so far as orders, inquiries and unfavorable replies are concerned, being shifted accordingly to drawers C, P, I or D, and the cards in drawer K of those who do not reply at all to the fourth letter are put in drawer T and a fifth letter sent to the persons whom they represent.

The cards in drawer T are disposed of just as those in H, G and K, except that the cards of those who do not reply at all are also shifted to drawers I or D, for having written them four letters without having received a reply, it is evident they are no longer interested and have dropped the matter.

Going back to the large drawer N, on the same level with drawer H, and which contains the cards of those to whom a second unanswered letter has been sent, these cards are disposed of similar to the cards in original drawer E, so far as they represent persons from whom answers are received, that is to say, such cards are shifted to drawers H, I or D. The cards in drawer N of those from whom no reply is received to the second letter are all transferred to the next lower large drawer R, and a third letter sent to the persons whom they represent.

Of the cards in the drawer R, those representing persons from whom replies are received to said third letter are transferred to drawers H, I or D, according to the nature of said replies, as has already been described. The cards in drawer R of those from whom no reply is received to the third letter are all transferred to the large drawer Z beneath, and a fourth letter sent to them.

Of the cards in drawer Z, those representing persons from whom replies to such fourth letter are received are transferred to drawers H, I or D according to the nature of said replies, as has been already described, and those representing persons who do not reply at all are also transferred to drawers I or D, for, having sent them four letters without receiving any reply, it is evident they are not interested in the proposition.

All those whose cards are in drawer P receive the special attention which is required, and ultimately go into drawers C, I and D, according to whether the persons whom they represent become customers or make unfavorable replies.

Obviously at the close of a theoretically perfect and complete campaign of this sort all of the cards which were first in drawer E will be in drawers C and I and D, and if desired the cards in drawer I can be carried through another sales campaign of a different nature. The cards in drawer D are of no use for advertising purposes, and the people represented by the cards in drawer C have been made customers.

It will be noted that the first or top drawer E, contains the cards of those to whom one letter has been sent, and beyond this are two diverging series of drawers, the successive drawers of one series adapted to contain the cards of those who have received two, three and four unanswered letters, respectively, while the successive drawers of the other line are adapted to contain the cards of those who have received one, two, three and four unanswered letters after an answered one. The last or bottom drawers contain the cards of all those who have made unfavorable replies, whether of any subsequent use or not, and ultimately receive all unanswered cards.

By the construction of cabinet which I have set forth it will be noted that the bottom wide drawer I can be open at the same time that any of the upper drawers are open, and yet access readily had to its interior chamber. This is because of the series of wide drawers decreasing downwardly in width and the narrow drawers in the horizontal series with them, whereby when any one of said drawers of the decreasing series or of the narrow drawers is open, it does not entirely cover the said lower wide drawer for the final disposition of the cards.

Obviously my improved cabinet enables a perfect classification of the correspondence to be made and kept constantly in order, by simply following the directions upon the labels of the various drawers, which are shown in Fig. 2 of the drawing for greater clearness and more perfect understanding of the invention. With a proper set of form letters and this cabinet, a stenographer or clerk can accurately and systematically conduct a sales campaign with positive certainty as to the results, and a great deal of labor, loss of energy and positive damage by mistakes is saved.

Having thus described the invention, what I claim is—

The hereindescribed filing cabinet, comprising a body with a drawer-receiving portion rectangular in front elevation, a vertical tier of drawers providing an upper wide drawer and successive drawers of progressively decreasing width in a downward direction, the walls of said drawers at one corresponding side of them being in vertical alinement at one upright end of the cabinet, narrow drawers between said successive drawers of the series and the opposite upright end of the cabinet, a lower wide drawer extending from said opposite upright end of the cabinet beneath the stepped ends of the drawers of progressively decreasing width, and a lower narrow drawer in the same series with said lower wide drawer, the combined lengths of the drawers in each horizontal series being substantially the same, substantially as and for the purposes set forth.

JOSEPH CLIFFORD DANDO.

In the presence of—
GEORGE KOPPENHOEFER, Jr.,
THOMAS STOTESBURY DANDO.

Copies of this patent may be obtained for five cents each, by addressing the "Commissioner of Patents, Washington, D. C."